United States Patent [19]
Ziegler

[11] 4,032,119
[45] June 28, 1977

[54] LANCE SEAL FOR CONVERTER VESSEL GAS COLLECTING HOOD

[75] Inventor: Joseph Ziegler, Apollo, Pa.
[73] Assignee: Pennsylvania Engineering Corporation, Pittsburgh, Pa.
[22] Filed: Mar. 11, 1976
[21] Appl. No.: 666,038
[52] U.S. Cl. .............................................. 266/158
[51] Int. Cl.² ......................................... C21C 5/40
[58] Field of Search ................... 266/158, 225, 226

[56] References Cited
UNITED STATES PATENTS

| | | | |
|---|---|---|---|
| 3,138,648 | 6/1964 | McFeaters | 266/158 |
| 3,170,017 | 2/1965 | Namy | 266/158 |

Primary Examiner—Gerald A. Dost
Attorney, Agent, or Firm—Fred Wiviott

[57] ABSTRACT

A lance port seal for BOF vessel gas collecting hoods includes a pair of seal portions each having registrable semi-circular openings for receiving an oxygen lance therethrough. A support assembly mounts the seal members above the lance port for limited two-dimensional movement in a plane generally normal to the axis of the lance. The seal portions are also pivotally mounted on the support assembly for movement toward and away from the other member for permitting insertion and removal of the lance and for re-establishing the seal after the lance is in position.

27 Claims, 10 Drawing Figures

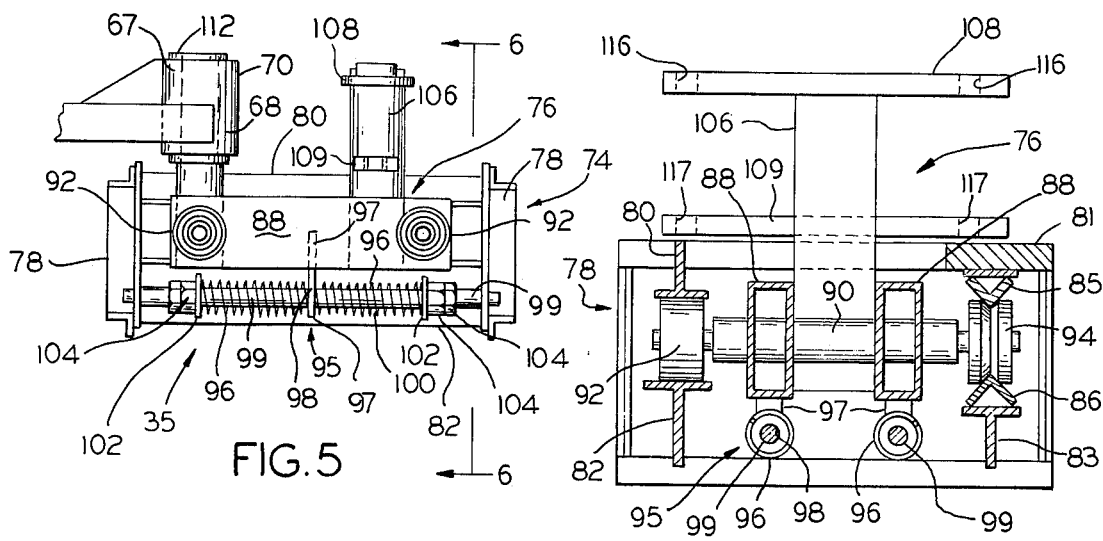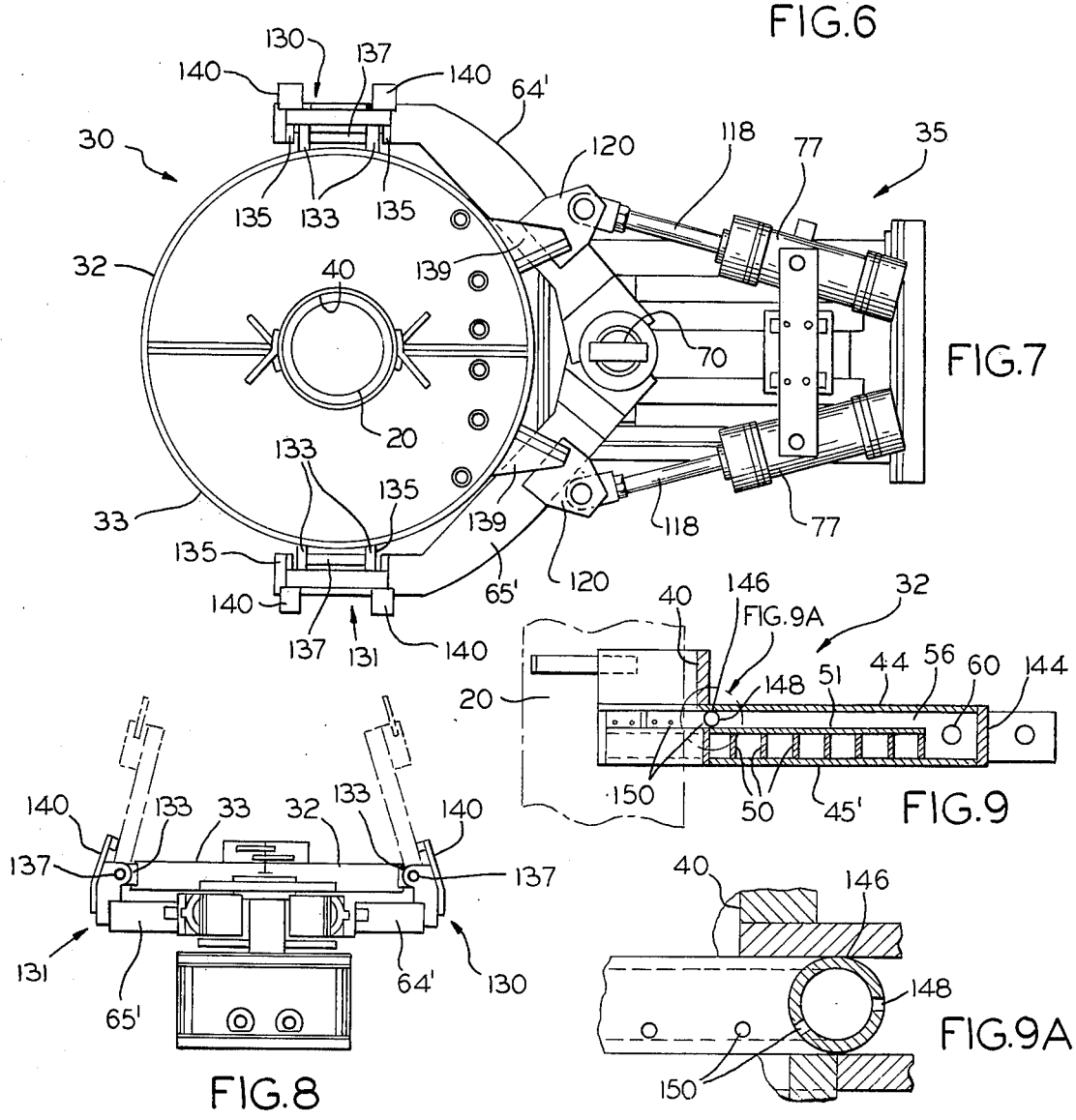

LANCE SEAL FOR CONVERTER VESSEL GAS COLLECTING HOOD

BACKGROUND OF THE INVENTION

This invention relates to apparatus for sealing the lance port in the gas collecting hood of pneumatic steel making apparatus.

In pneumatic steel converter vessels, air or oxygen is delivered to the molten metal for oxidizing silicon, phosphorus, carbon and other impurities. In one type of pneumatic steel making process, oxygen is blown at high velocity onto the surface of the metal bath in a basic lined vessel by an elongate water-cooled lance inserted through the open mouth of the vessel. In this type of apparatus, commonly called a BOF furnace, the oxygen jet striking the bath causes reactions leading to the formation of carbon monoxide which gives rise to a vigorous boiling action. In addition, iron oxide is also formed, a portion of which issues from the vessel as a brownish smoke along with the carbon monoxide and other gases. As a result, BOF furnaces are commonly provided with a gas collecting hood disposed above the open upper end of the vessel for collecting gases and particulate material discharging from the vessel. Such gas collecting hoods are connected to gas cleaning systems which remove particulates and either flare or collect combustible gases for use as fuel.

Oxygen lances commonly employed with BOF vessels generally comprise an elongate tubular water-cooled member which is inserted longitudinally through the mouth of the vessel so its discharge end is in relatively closed proximity to the molten metal durng an oxygen blowing period. After the completion of the main oxygen blow, the lance is withdrawn from the furnace to permit the latter to be tilted for sampling, deslagging, pouring and thereafter the charging of scrap and hot metal for subsequent steel making cycles. Because the gas collecting hood is preferably disposed above the open upper end of the vessel during a blowing operation to effectively capture discharging gases and particulate matter, such hoods are commonly provided with a lance port to permit the lance to pass through the hood and into the vessel. Such lance ports must be substantially larger in cross-sectional area than the lance because the lance tends to thrash about and swing in reaction to the oxygen issuing from its lower end. In addition, the lance tends to become encrusted with metal and slag during the blowing operation thereby increasing the nominal outside diameter of that portion disposed within the furnace and below the lance port. For this reason, a gap normally existed between the lance and the lance port during a blowing operation which permitted some polluting gases and particulate matter to escape from the smoke hood.

SUMMARY OF THE INVENTION

It is an object of the invention to provide a seal for the lance port of a metallurgical vessel gas collecting hood.

Another object of the invention is to provide a metallurgical vessel gas collecting hood lance port seal which permits the lance to move in reaction to the oxygen issuing from its lower end.

A still further object of the invention is to provide a metallurgical vessel gas collecting hood lance port seal which permits portions of the lance which may be encrusted with slag or metal to pass therethrough.

These and other objects and advantages of the present invention are achieved by a seal assembly mounted above the lance port of a metallurgical vessel gas collecting hood and mounted for limited movement in a plane generally normal to the axis of the lance and which is selectively openable and closable to permit slag and metal encrusted portions of the lance to pass therethrough.

BRIEF DESCRIPTION OF THE PREFERRED EMBODIMENT

FIG. 5 is a fragmentary view of a portion of the port seal apparatus shown in FIGS. 2 and 3;

FIG. 6 is a view taken along lines 6—6 of FIG. 5;

FIG. 7 is a top plan view of an alternate embodiment of the invention;

FIG. 8 is a side elevational view of the embodiment shown in FIG. 7; and

FIG. 9 is a view taken along line 9—9 of FIG. 7.

DESCRIPTION OF THE PREFERRED EMBODIMENT

Figure 1:
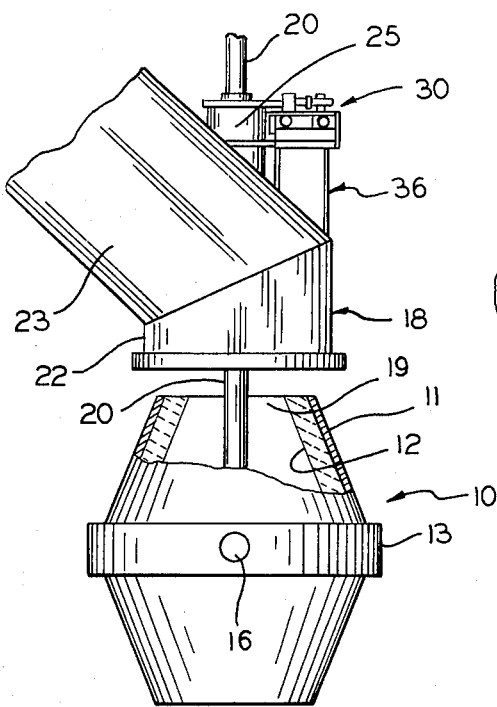
FIG. 1 is a side elevational view showing a metallurgical vessel having a gas collecting hood provided with a lance port seal according to the invention.
Figure 2:
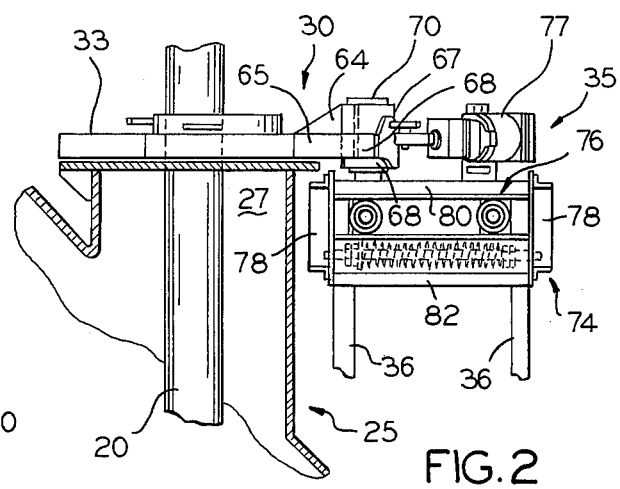
FIG. 2 is a side elevational view of the lance port seal according to the invention.

A converter vessel 10, to which the present invention is applicable, is shown in FIG. 1 to include a metallic shell 11 and a refractory lining 12. As those skilled in the art will appreciate, converter vessels or furnaces of the type illustrated are generally supported in a conventional manner on a trunnion ring 13 which is suitably affixed to the shell 11 and which has generally coaxial trunnion pins 16 extending from its opposite sides. The trunnion pins 16 are suitably supported in a well known manner on bearing structures (not shown) and which are coupled to a suitable drive mechanism (not shown) for tilting the vessel 10 to each of a plurality of positions for receiving hot metal or scrap or for discharging metal or slag.

A gas collecting hood 18 is disposed above the open mouth 19 of vessel 10. As those skilled in the art will appreciate, the hood 18 is connected to a gas cleaning system (not shown) which removes particulate matter from the gas stream discharging from the vessel 10 and which cools and either collects for use as fuel or flares combustible gases such as carbon monoxide. The hood 18 may be constructed in any well-known manner such as by the use of tubular membranes which includes a plurality of hollow tubular members suitable joined in a side-by-side manner so that the hood 18 may be cooled by the delivery of cooling water to the interior of the tubular members.

An oxygen lance 20 is suitably mounted in any well-known manner on a suitable support assembly for being lowered into and withdrawn from the interior of the vessel 10 so that oxygen may be delivered to the surface of the molten metal contained therein. The hood 18 is formed with a generally vertical section 22 disposed above the mouth 19 of vessel 10 and a second portion 23 extending obliquely upwardly and generally to the left as viewed in FIG. 1 for being connected to the gas cleaning system. At a point in section 23 which is generally vertically above the mouth 19 of vessel 10, there is formed a lance port 25 which consists of a vertically oriented generally vertical section of tubular membrane construction which is affixed in a sealing relation at its line of intersection with the obliquely extending portion 23. The upper end of the lance port section 25 defines a generally circular opening 27 which is coaxial with and substantially larger than the lance 20. A lance port seal assembly 30 according to the present invention is disposed at the upper end of the section 25 for generally sealing the gap between the outer periphery of opening 27 and the lance 20.

In general terms, the lance port seal assembly 30 includes a pair of segments 32 and 33 arranged generally above the lance port opening 27 and an operating and support assembly 35 mounted atop the hood 18 by means of a support frame 36. The segments each have a semi-circular recess 40 which cooperate to provide an opening for lance 20.

Because the segments 32 and 33 are substantially identical, except that one is the mirror image of the other, only segment 32 will be discussed in detail for the sake of brevity. Identical portions of segments 32 and 33 will be given the same reference numerals.

Figure 4:
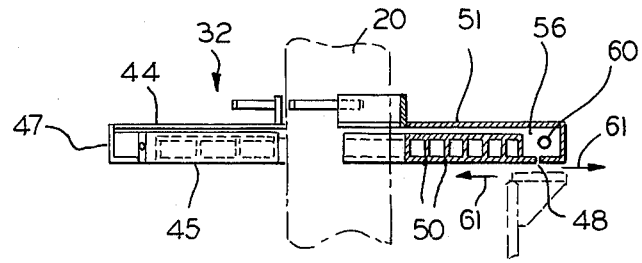
FIG. 4 is a view taken along lines 4—4 of FIG. 3.
Figure 3:
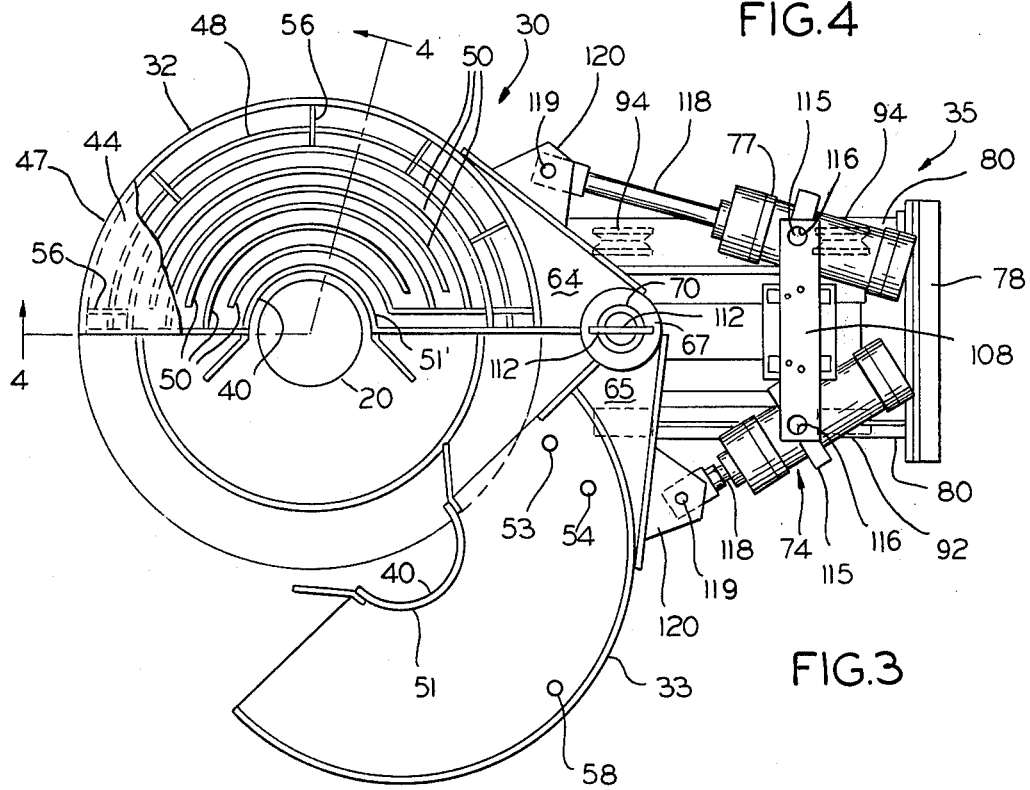
FIG. 3 is a top plan view of the assembly illustrated in FIG. 2.

As seen in FIGS. 3 and 4, the segment 32 includes a generally semi-circular top plate 44 and a slightly smaller generally semi-circular bottom plate 45 which is arranged in a spaced apart generally parallel relation relative to plate 44.

A generally semi-circular angle member 47 is affixed to the outer periphery of top plate 44 and extends downwardly and inwardly therefrom and terminates in spaced relation from the outer periphery of the lower plate 45 to define a semi-circular gap 48 therebetween. A plurality of spaced apart ribs 50 are affixed to and extend upwardly from the lower plate 45 and a plate 51 is affixed to their upper ends to define a tortuous cooling water flow path. A cooling water inlet 53 (see segment 33) is connected to one end of the innermost portion of the flow path and a cooling water outlet 54 is connected to the end of the outermost portion thereof. Each of the plates 44 and 45 has a semi-circular recessed portion which coincides with the innermost rib 51' to define the semi-circular recess 40 in segment 32 and which is slightly larger in diameter than lance 20. It will be appreciated that cooling water delivered to inlet 53 will flow along the tortuous path to the outlet 54 to thereby cool the plates 45 and 51 and in particular the innermost rib 50' which defines the inner face of the semi-circular recess 40.

A plurality of reinforcing ribs 56 extend across the gap 48 and between the angle member 47 and the plates 44 and 45 and across the gap between plates 44 and 51. A nitrogen inlet 58 is provided in the top plate 44 and adjacent the outer periphery thereof and generally above the gap 48. In addition, a plurality of openings 60 are formed in the ribs 56 to permit nitrogen to flow therethrough. The inlet 58 is connected to a suitable source of nitrogen under pressure so that this gas will fill the arcuate gap between the outermost rib 50 and the angle member 47 and the area above plate 51 and flow downwardly through the gap 48 and from there inwardly and outwardly along the bottom of segment 32 as indicated by arrows 61 in FIG. 4. This prevents oxygen from accumulating within or below the segments 32 and 33 which could result in a potentially explosive condition as a result of the carbon monoxide flowing in conduit 23.

The segments 32 and 33 are connected to the operating and support assembly 35 by pivot arms 64 and 65 which are respectively affixed to the ends of segments 32 and 33. Each arm 64 and 65 is coupled on the support assembly 35 for pivotal movement in a generally horizontal plane for moving segments 32 and 33 from a closed position wherein the segments are in an abutting relation with their recesses 51' forming a circular opening and to an open position shown by the position of segment 33 in full lines in FIG. 3. More specifically, the arms 64 and 65 have respective bearings 67 and 68 at their remote ends and each bearing is rotatably received on a pivot pin 70 which extends from the support assembly 35. In order to permit both bearing members 67 and 68 to be received simultaneously on the pin 70, arm 64 extends obliquely upwardly so that bearing 67 may be positioned in a coaxial relation above bearing 68.

Support assembly 35 also includes a frame assembly 74 mounted atop support frame 36, a carriage assemby 76 which is resiliently mounted on frame assembly 74 and an operating cylinder 77 for moving the segments 32 and 33 between their open and closed positions.

As seen in FIGS. 2, 3, 5 and 6, the frame 74 includes a pair of end assemblies 78 formed of structural members which are suitably joined in a rectangular array. In addition, a first pair of spaced apart, generally parallel structural members 80 and 81 extend between the upper portions of end assemblies 78 and are suitably affixed thereto while a second pair of spaced apart, generally parallel structural members 82 and 83 extend across and are affixed to the lower portions of the assemblies 78. In addition, members 82 and 83 are affixed to the upper end of the support frame 36. The members 80 and 82 on the left side of the frame assembly 74 as viewed in FIG. 6 are generally T-shaped and arranged in a parallel opposed relation for defining a track for one side of the carriage 76. At the opposite side of the frame assembly 74, the member 81 is generally rectangular and the member 83 is generally T-shaped and disposed in a generally parallel relation to the remaining members. Affixed to the parallel opposed surfaces of the members 81 and 83 are angle members 85 and 86 whose apexes define a track for the opposite side of carriage 76. Carriage 76 is comprised of a pair of generally parallel box beam members 88 which are affixed in spaced apart relation by means of a pair of pin members 90 which extend in spaced apart relation to each other and generally normal to and through box beam members 88. A pair of generally cylindrical wheels 92 are affixed to the pins 90 at the left side of the assembly as seen in FIG. 6 for being received between the members 80 and 82 while a pair of slotted wheels 94 are mounted on pins 90 at the opposite side of the assembly and each engages the angle members 85 and 86.

A resilient coupling assembly 95 connects the carriage 76 to the frame assembly 74 and includes a plurality of springs 96. Extending downwardly from each of the box beam members 88 is a lug 97 and which has an opening 93 formed therein to permit a guide rod 99 to pass therethrough. The ends of each guide rod 96 is affixed to the end assemblies 78 in general parallelism with and between the bottom frame members 82 and 83. A pair of the springs 96 are disposed on each guide rod and one spring of each pair is disposed on the opposed sides of the lug 97 and against which one end of each spring 96 bears. The opposite ends of each of the springs 96 engages a washer 102 which is suitably held in position on rod 99 by nut 104. It will be appreciated from the foregoing that the springs 96 tend to retain carriage 76 in a central position relative to the frame assembly 74.

Extending upwardly from carriage 76 and from between the box beam members 88 and adjacent one of the ends thereof is a vertically extending support post 106 which has a first support bracket 108 affixed in a generally horizontal relation to its upper end and a second support bracket 109 affixed intermediate its ends and in parallel relation to the bracket 108. The pivot pin 70 extends generally vertically from the opposite end of carriage 76 and in a general parallel relation to post 106. The bearings 67 and 68 are maintained in position on post 70 by means of a shear pin 112 as seen in FIG. 3.

The operating cylinders 77 are mounted for pivotal movement about generally vertical axes by means of trunnion pins 115 which extend through apertures 116 in bracket member 108 and apertures 117 in bracket member 109. Each cylinder 75 includes a piston rod 118 whose free end is pivotally connected by pins 119 to brackets 120 affixed to the outer surfaces of the pivot arms 64 and 65. The cylinders 77 are preferably double acting and are each connected to a source of air under pressure (not shown).

When it is desired to either insert or withdraw the lance 20 from the vessel 10, the double acting air cylinders are each operated to move the piston rods 18 inwardly thereby pivoting each of the segments 32 and 33 away from each other and about the pivot pins 70. It will be appreciated that while only segment 33 is shown to be pivoted in FIG. 3, in actual operation both segments 32 and 33 may be pivoted to an open position whereby they are displaced from each other.

Assume that the lance 20 has been inserted for a blowing operation. After the lance has been so positioned, the cylinders 75 are actuated to pivot the segments 32 and 33 toward each other so that they are both in a closed position shown by the segment 32 in FIG. 3. The vent portion 27 is then substantially closed except for the small annular opening between lance 20 and the segment ribs 51' and a small gap existing below the segments and above the upper end of the lance port section 25. The oxygen blowing operation can then commence. It will be appreciated that during the blowing operation, lance 20 will swing within the opening 40 and into engagement with the segments 32 and 33. Movement of the lance 20 in a direction generally parallel to the base frame members 80, 81, 82 will be transmitted through segments 32 and 33 to pivot post 70 and then to carriage 76 where the shock will be absorbed by springs 76. Movement of lance 20 in any other direction will be taken up by the air cylinders 75. As a result, the segments 32 and 33 will be able to move along with the lance 20 with the forces resulting from lance movement being absorbed either by the springs 77 or the air cylinders 75.

At the completion of a blowing operation, the segments 32 and 33 are again swung apart to permit the lance which may be encrusted with slag or metal to be withdrawn from the vessel. In the event of a malfunction, however, where it is necessary to rapidly withdraw the lance without first separating the segments 32 and 33, or where there is a failure in the air system connected to cylinders 77, such rapid withdrawal is made possible as the result of the shear pin 112 which holds the segments on posts 70. If the lance is rapidly withdrawn and its lower end is so encrusted that it is larger than the opening 40, one or both of the segments 32 and 33 may be forced upwardly as shear pin 112 falls so that one or both of the segments 32 or 33 will fall away from each other to be held only by the brackets 120.

FIGS. 7 and 8 show an alternate embodiment of the invention wherein the lance port seal 30, the segments 32 and 33 and the support assembly 35 are substantially identical to that shown in FIGS. 2–6. The embodiment of FIGS. 7 and 8 differs from that of FIGS. 2–6, however, in the manner in which the segments 32 and 33 are connected to the support assembly 35. More specifically, the segments 32 and 33 are each pivotally coupled to their respective pivot arms 64' and 65' by hinge assemblies 130 and 131 which are located on the sides of the respective segments and symmetrical relative to the center line of the port opening 40.

Each hinge assembly 130 and 131 includes a pair of horizontally spaced apart generally parallel hinge members 133 which extend outwardly from the sides of its associated segment and a second pair of horizontally spaced apart generally parallel hinge members 135 are affixed to each arm 64' and 65' and which are in alignment with and adjacent the outer surface of their associated hinge members 133. A hinge pin 137 extends horizontally through aligned openings in hinge members 133 and 135 and are substantially parallel to each other. Each of the segments 32 and 33 is thereby coupled to its respective arm 64' and 65' for pivotal movement about substantially parallel horizontal axes. A stop member 139 extends radially outwardly from each of the segments 32 and 33 and engages the upper surface of its associated arm 64' and 65' so that the segments 32 and 33 are held in a substantially horizontal and symmetric relation relative to the lance 20. In addition, a pair of stops 140 extend upwardly from the hinge assemblies 130 and 131 to limit the degree of upward pivotal movement of each segment 32 and 33.

If it becomes necessary to rapidly withdraw the lance 20 or should there by a failure in the pressure system to the cylinders 77, the lance 20 may be withdrawn vertically and if its diameter exceeds that of the opening 40, one or both of the segments 32 or 33 can pivot upwardly around its respective hinge pins 137 from their positions shown by full lines in FIG. 8 to the positions shown by broken lines. It will, of course, be appreciated that each of the segments 32 and 33 may be pivoted horizontally in an outward direction and away from lance 20 in the manner illustrated in FIG. 3 by the operation of the cylinder 77 acting through piston rods 118 and the pivotal connection with the brackets 120 affixed to arms 64' and 65'.

FIG. 9 shows an alternate method of nitrogen gas distribution about the opening 40. Specifically, the bottom plate 45' of segment 32 is imperforate and extends to and is joined with a semi-circular peripheral wall 144. In addition, semi-circular pipe 146 is disposed in the gap between the plates 44 and 51 and in general alignment with the semicircular recess 40. The pipe 146 has a first plurality of openings 148 on its side facing the gap between plates 44 and 51 and a second plurality of openings 150 facing inwardly toward the lance 20. Accordingly, nitrogen delivered to the space between plates 44 and 51 will flow into pipe 146 through openings 148 and outwardly through openings 150 and into the gap between the segment 32 and the lance 20.

While only a single embodiment of the invention has been shown and described, it is not intended to be limited thereby but only by the scope of the appended claims.

I claim:

1. A gas collecting hood disposed above the opening in a metallurgical vessel for collecting gases discharging therefrom,
a port formed in said hood to permit a lance to pass through said hood and into the opening in said vessel,
a seal assembly for said port and having an opening therein to permit said lance to pass therethrough in relatively closely spaced relation,
and resilient means for resiliently mounting said seal assembly for movement in a plane generally normal to the axis of the lance to permit movement of said lance in said opening in reaction to the discharge of gas from the lower end thereof, said resilient means permitting said seal assembly to move with said lance.

2. The invention set forth in claim 1 wherein said seal assembly includes separable portions which define said seal opening, and operating means for moving at least one of said separable portions away from the other to permit movement of said lance into and out of said port without interference of said portions.

3. The invention set forth in claim 2 wherein at least one of said portions is mounted for pivotal movement about a generally vertical axis, said operating means being coupled for selectively moving said one portion between a closed position adjacent said port and an open position displaced therefrom.

4. The invention set forth in claim 3 wherein each of said portions are mounted for movement about a common axis, said operating means being effective for pivoting said portions about said axis and between open and closed positions relative to said port.

5. The invention set forth in claim 4 wherein said operating means includes power means coupled to said portions and having expandable and compressible means to permit nominal movement of said portions relative to said port.

6. The invention set forth in claim 5 wherein said operating means includes air cylinder means for pivoting each of said portions about said axis.

7. The invention set forth in claim 2 and including support means for said seal means wherein said support means includes first means fixedly mounted relative to said port and second means, said resilient means resiliently mounting said second means on said first means, said seal means being mounted on said second means.

8. The invention set forth in claim 7 wherein said first means comprises frame means mounted on said hood, said second means being mounted on said first means for limited movement in a direction generally normal to the axis of said port, said resilient means including spring means coupling said second means to said first means.

9. The invention set forth in claim 8 wherein said operating means includes air cylinder means mounted on said second means, bearing means mounted on said second means, said portions being pivotally mounted on said bearing means for movement about an axis generaly parallel to the axis of said port.

10. The invention set forth in claim 9 wherein said second means comprises carriage means including roller means, said frame means including track means extending in said generally normal direction, said roller means being mounted on said track means, said spring means extending in said normal direction and between said frame means and said roller means.

11. The invention set forth in claim 10 wherein said port is generally circular, said portions each comprising a semi-circular segment and having a semi-circular opening formed in the chordal side thereof, said segments being pivotal from a first position adjacent each other and said port and to a second displaced position, said semi-circular openings being disposed adjacent to each other and generally coaxial with said port when said segments are in their first position, said air cylinder means comprising a pair of air cylinders each coupled to one of said segments for pivoting the same, each of said air cylinders being pivotally coupled to its associated segment and to said carriage means and about axes which are generally parallel to each other and to said bearing means.

12. The invention set forth in claim 11, wherein each of said segments are generally hollow, meand disposed in each segment for defining an enclosed tortuous flow path, and means for delivering cooling water to one end of said flow path and for withdrawing cooling water from the other end thereof.

13. The invention set forth in claim 10 and including means for delivering an inert gas to said segments and for discharging the same along peripheral portions thereof to prevent oxygen from collecting under seal means.

14. The invention set forth in claim 8 wherein said second means comprises carriage means including roller means, said frame means including track means extending in said generally normal direction, said roller means being mounted on said track means.

15. The invention set forth in claim 14 wherein said port is generally circular, said portions each comprising a semicircular segment and having a semi-circular opeaniang formed in the chordal side thereof, said segments being pivotally mounted on said second means for movement from a first position adjacent each other and said port and to a second displaced position and about an axis generally parallel to the axis of said port, said semi-circular openings being disposed adjacent to each other and generally coaxial with said port when said segments are in their first position.

16. The invention set forth in claim 15, wherein carriage means includes a support post oriented generally parallel to the axis of said port and extending generally upwardly, each of said segments include arm means pivotally mounted on said support post and shear pin means coupled to the upper end of said support post for holding each of said arm means thereon.

17. The invention set forth in claim 16 wherein said operating means includes power means coupled to said segments and having expandable and compressible means to permit nominal movement of said segments relative to said port.

18. The invention set forth in claim 17 and including means for delivering an inert gas to said segments and for discharging the same along peripheral portions thereof to prevent oxygen from collecting under seal means.

19. A seal assembly for the port of a metullurgical vessel gas collecting hood, said assembly having an opening therein to permit said lance to pass therethrough in relatively closely spaced relation, resilient means for resiliently mounting said seal assembly for movement in a plane generally normal to the axis of the lance to permit movement of said lance in said opening in reaction to the discharge of gas from the lower end thereof, said resilient means permitting said seal assembly to move with said lance, said seal assembly including separable portions which define said opening, and operating means for moving at least one of said separable portions away from the other to permit movement of said lance into and out of said port without interference of said portions.

20. The invention set forth in claim 19 wherein said operating means include a pair of arm means one of which is coupled to each of said portions, each of said arm means being mounted for pivotal movement about a generally vertical pivot axis, said operating means being coupled for selectively pivoting said arm means about said pivot axis for selectively moving said portions between a closed position adjacent said port and an open position displaced therefrom, each of said portions being mounted on its associated arm means for pivotal movement about a generally horizontal axis and away from each other so that said segments may also pivot away from said port in the event that the withdrawal of said lance is necessary.

21. The invention set forth in claim 20 wherein said portions each have an inner edge surface disposed adjacent the other for substantially closing said opening, a recess formined in each of said edge surfaces for defining a passage for said lance, said portions being pivotal about said horizontal axes and said arm means being pivotal such that said edge surfaces move away from each other.

22. the invention set forth in claim 21 and including support means having first means fixedly mounted relative to said opening and second means, said resilient means resiliently mounting said second means on said first means, aid seal assembly being mounted on said second means, said second means being mounted on said first means for limited movement in a direction generally normal to the axis of said opening.

23. The invention set forth in claim 22 wherein said opening is generally circular, said portions each comprising a semi-circular segment having a semi-circular recess formed in the chordal side thereof, said segments being pivotal from a first position adjacent each other and above said opening to a second displaced position, said semi-circular openings being disposed adjacent to each other and generally coaxial with said ports when said segments are in their first position.

24. The invention set forth in claim 23 wherein each of said segments are hollow and divided into generally upper and lower portions, means for circulating a cooling fluid through the lower portion of said segments and a non-oXidizing gas through the upper portion of said segments, and perforate in each of said segments for delivering said gas to said semi-circular recess.

25. A gas collecting hood adapted to be disposed above the opening in a metallurgical vessel for collecting gases discharging therefrom, a port formed in said hood to permit a lance to pass through said hood and into the opening in said vessel.

support means fixedly mounted relative to said port, a seal assembly for said port and having an opening therein to permit said lance to pass therethrough in relatively closely spaced relation, and resilient means for resiliently mounting said seal assembly on said support means for movement in a plane generally normal to the axis of the lance to permit movement of said lance in said vessel opening in reaction to the discharge of gas from the lower end thereof, said resilient means permitting said seal assemly to move with said lance.

26. The invention set forth in claim 15 wherein said support means comprising frame means mounted on said hood, and second means mounted on said frame means for limited movement of direction generally normal to the axis of said port, said resilient means including spring means coupling said second means to said frame means.

27. The invention set forth in claim 25 wherein said second means comprises carriage means including roller means, said frame means including track means extending in said generally normal direction, said roller means being mounted on said track means, said spring means extending in said first direction and between said frame means and said roller means.

* * * * *

UNITED STATES PATENT OFFICE
CERTIFICATE OF CORRECTION

Patent No. 4,032,119           Dated   June 28, 1977

Inventor(s)  Joseph Ziegler

It is certified that error appears in the above-identified patent and that said Letters Patent are hereby corrected as shown below:

Claim 15, Column 8, lines 38 and 39, cancel "openiang" and substitute --opening--.

Claim 22, Column 9, line 40, cancel "aid" and substitute --said--.

Claim 23, Column 10, line 6, cancel "ports" and substitute --port--.

Claim 24, Column 10, line 11, cancel "non-oXidizing" and substitute --non-oxidizing--; line 12, after "perforate" insert --means--.

Claim 26, Column 10, line 32, cancel "comprising" and substitute --comprises--.

Signed and Sealed this

Twentieth Day of September 1977

[SEAL]

Attest:

RUTH C. MASON
Attesting Officer

LUTRELLE F. PARKER
Acting Commissioner of Patents and Trademarks